United States Patent
Boudier

(10) Patent No.: US 9,242,746 B2
(45) Date of Patent: Jan. 26, 2016

(54) AUGMENTATION OF A MONOPROPELLANT PROPULSION SYSTEM

(75) Inventor: Guillaume Boudier, Toulouse (FR)

(73) Assignee: CENTRE NATIONAL D'ETUDES SPATIALES (FR)

( * ) Notice: Subject to any disclaimer, the term of this patent is extended or adjusted under 35 U.S.C. 154(b) by 649 days.

(21) Appl. No.: 13/340,832

(22) Filed: Dec. 30, 2011

(65) Prior Publication Data
US 2012/0198818 A1   Aug. 9, 2012

(30) Foreign Application Priority Data
Jan. 3, 2011   (FR) ..................... 11 50003

(51) Int. Cl.
F02K 9/00   (2006.01)
B64G 1/40   (2006.01)
F02K 9/50   (2006.01)

(52) U.S. Cl.
CPC .. B64G 1/402 (2013.01); F02K 9/50 (2013.01)

(58) Field of Classification Search
CPC ........... F02K 9/50; B64G 1/402; B64G 1/401
USPC ............. 60/200.1, 39.462; 244/171.1, 172.3
See application file for complete search history.

(56) References Cited

U.S. PATENT DOCUMENTS

| | | | | |
|---|---|---|---|---|
| 3,136,121 | A * | 6/1964 | Barger et al. | 60/259 |
| 3,231,224 | A * | 1/1966 | Koelle | 244/52 |
| 3,254,486 | A * | 6/1966 | Kenny | 60/258 |
| 3,266,236 | A * | 8/1966 | Biehl et al. | 60/211 |
| 3,534,765 | A | 10/1970 | Paine et al. | |
| 3,807,657 | A * | 4/1974 | Brill | 244/1 R |
| 3,981,418 | A | 9/1976 | Williamson et al. | |
| 4,120,151 | A * | 10/1978 | Quigley, Jr. | 60/39.462 |
| 4,787,579 | A * | 11/1988 | Smith | 244/169 |
| 5,071,093 | A * | 12/1991 | Perdu | 244/135 R |
| 2004/0035982 | A1* | 2/2004 | Capozzi et al. | 244/172 |

FOREIGN PATENT DOCUMENTS

| | | |
|---|---|---|
| EP | 0570721 A1 | 11/1993 |
| WO | 9626108 A1 | 8/1996 |
| WO | 03047969 A2 | 6/2003 |

OTHER PUBLICATIONS

European Search Report, EP 12150038, dated Feb. 17, 2012.

* cited by examiner

*Primary Examiner* — Gerald L Sung
(74) *Attorney, Agent, or Firm* — Lerner, David, Littenberg, Krumholz & Mentlik, LLP

(57) ABSTRACT

A propulsion system of a spacecraft comprises a main tank adapted to contain a volume of propellant and a pressurizing gas which applies pressure to the propellant. The main tank comprises a membrane delimiting an upper volume to contain the pressurizing gas and an inferior volume to contain the propellant, the gas applying the pressure to the propellant by means of the membrane. A pressurization circuit is connected directly to the main tank. The propulsion system further comprises an auxiliary tank adapted to contain pressurizing gas. The auxiliary tank is connected directly to the main tank by means of the pressurization circuit. When in operation, gas contained in the auxiliary tank expands continuously with the gas contained in the upper volume of the main tank, the pressures prevailing in the upper volume of the main tank, in the pressurization circuit and in the auxiliary tank being identical. The auxiliary tank is dimensioned so that the maximal volume of propellant of the main tank is greater than the volume of propellant which the main tank can contain without an auxiliary tank.

7 Claims, 1 Drawing Sheet

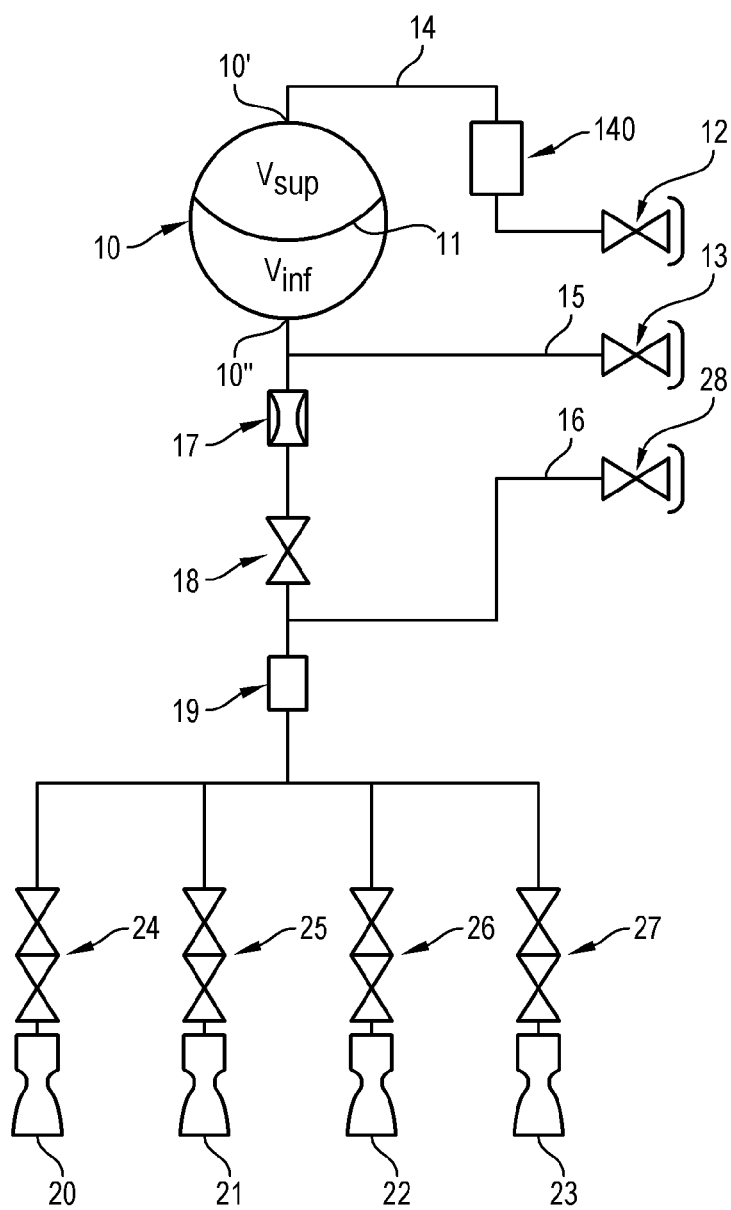

US 9,242,746 B2

AUGMENTATION OF A MONOPROPELLANT PROPULSION SYSTEM

CROSS REFERENCE TO RELATED APPLICATIONS

This application claims the benefit of French Patent Application No. 1150003 filed Jan. 3, 2011, the disclosure of which is hereby incorporated herein by reference.

FIELD OF THE INVENTION

The invention relates to a propulsion system of a spacecraft comprising a membrane propellant tank.

BACKGROUND OF THE INVENTION

A propulsion system of a spacecraft allows the spacecraft, during a mission, to change orbit, maintain course on a preferred orbit and control its attitude.

Such a propulsion system mainly comprises a propellant tank and propulsion units.

The tank is pressurized when the spacecraft launches.

Current propulsion systems comprise a tank including a sealing membrane delimiting an upper volume and a lower volume.

In this type of propulsion system, pressurized pressurizing gas is stored in the upper volume and the propellant is stored in the lower volume.

The pressurizing gas feeds the propulsion units with propellant.

During the mission, the gas will expand from 24 bars at 50° C. to 5.5 bars at 10° C., minimal pressure admissible for supplying the propulsion units.

Therefore, at the start of the mission, the tank is filled with a volume $V_{c,0}$ of propellant and a volume $V_{g,0}$ of pressurizing gas. The quantity of gas is determined so that during the mission there is the following equality: $V_{g,0}/V_{g,f}=(P_f/P_0)*T_0/T_f$ where $V_{g,f}$ is the volume of gas on completion of the mission when the tank contains no more propellant, $P_0$ is the pressure in the tank when it is filled to its maximum capacity at the temperature $T_0$ and $P_f$ is the pressure in the tank at the temperature $T_f$ when the tank is empty.

A problem is that the maximum volume $V_{c,0}$ of propellant is limited because the tank contains gas to respect the constraints hereinabove. So, the duration of a mission is impacted by the capacity of the tank which is such that $V_{c,0}=V_{g,f}-V_{g,0}$.

SUMMARY OF THE INVENTION

An aim of the invention is to provide a propulsion system in which the propellant tank is capable of containing a volume of propellant greater than the usual volume for a given tank.

To attain this aim, according to a first aspect, the invention relates to a propulsion system of a spacecraft, comprising:
- a main tank adapted to contain a volume of propellant and pressurizing gas which applies pressure to the propellant, the main tank comprising a membrane delimiting an upper volume to contain the pressurizing gas and a lower volume to contain the propellant, the gas applying the pressure to the propellant by means of said membrane;
- a pressurization circuit connected directly to the main tank; the propulsion system being characterised in that it further comprises
- an auxiliary tank adapted to also contain pressurizing gas, the auxiliary tank being connected directly to the main tank by means of the pressurization circuit so that when in operation the gas contained in the auxiliary tank expands continuously with the gas contained in the upper volume of the main tank, the pressures prevailing in the upper volume of the main tank, in the pressurization circuit and in the auxiliary tank being identical, the auxiliary tank being dimensioned so that the maximum volume of propellant of the main tank is greater than the volume of propellant which the main tank can contain when the propulsion system comprises no auxiliary tank.

Other aspects of the propulsion system as per the first aspect of the invention are the following:
- the volume of propellant contained in the propulsion system is greater than 75% of the volume of the main tank;
- the auxiliary tank has a capacity of two liters;
- the propellant is hydrazine, the gas is an inert gas and the operating pressure is greater than 5.5 bars at 10° C.;
- the main tank, the auxiliary tank and the pressurization circuit are dimensioned so that the maximum pressure in the main tank is 24 bars at 50° C. when the tank contains the maximum volume of propellant;
- it comprises a filling/emptying valve for gas arranged at the end of the pressurization circuit;

And, the invention also relates to a spacecraft comprising a propulsion system according to the first aspect of the invention.

BRIEF DESCRIPTION OF THE DRAWING

FIG. 1 is a schematic diagram of a propulsion system in accordance with an embodiment of the invention. Other characteristics and advantages of the invention will emerge from the following description which is purely illustrative and non-limiting and which must be viewed relative to FIG. 1 which schematically illustrates a propulsion system according to the invention.

DETAILED DESCRIPTION OF THE INVENTION

The propulsion system according to the invention comprises a main tank 10 of propellant containing a propellant and pressurizing gas as well as an auxiliary tank 140 also containing pressurizing gas.

The propulsion system also comprises a pressurization circuit 14 connected directly to the main tank 10. Directly connected is understood as being directly connected without any intermediary (for example a valve).

The main tank 10 is defined by an upper volume $V_{sup}$ and a lower volume $V_{inf}$. The pressurizing gas is contained in the upper volume $V_{sup}$, whereas the propellant is contained in the lower volume $V_{inf}$.

The main tank 10 is preferably spherical. Other forms can be contemplated as a function of the carrier, for example a satellite.

The propellant is preferably liquid hydrazine $N_2H_4$ used as monopropellant in the propulsion system.

The gas is preferably an inert gas such as nitrogen $N_2$.

The main tank 10 is connected to at least one propulsion unit by way of a supply circuit. Four propulsion units 20, 21, 22, 23 are represented in the FIGURE.

The gas applies pressure P to the propellant to feed the propulsion units and improve their performance.

By way of advantage, the main tank 10 comprises a membrane 11 both to define the upper volume and to define the lower volume.

The membrane can comprise deformable polymer.

The membrane 11 is sealed and isolates the pressurizing gas from the propellant. Also, the membrane 11 transmits the pressure generated by the pressurizing gas to the propellant without any loss.

The auxiliary tank 140 is connected directly to the main tank 10 by means of the pressurization circuit 14 so that when in operation the gas contained in the auxiliary tank 140 expands continuously with the gas contained in the upper volume of the main tank 10, the pressures prevailing in the upper volume of the main tank, in the pressurization circuit and in the auxiliary tank being identical.

The pressurization circuit 14, is consequently connected directly to an intake 10' of the tank 10. Also, the pressurization circuit 14 is closed at its end by a filling/emptying valve 12.

The auxiliary tank 140 is arranged between the intake 10' of the tank 10 and its end closed by a valve 12.

The pressurization circuit 14 is, for example, in the form of a cylindrical tube of a diameter typically equaling ¼ inch.

During operation, the gas coming from the auxiliary tank 140 and by way of the pressurization circuit 14 pushes the propellant to an outlet 10" of the tank via the membrane 11.

The intake 10' and the outlet 10" of the tank are preferably opposite and aligned along an axis of symmetry (not shown) of the tank 10.

The intake 10' and outlet 10" are circular and are such that the connections with the pressurization circuit 14 and the supply circuit of the propulsion units are sealed tight.

The supply circuit comprises a network of tubes along which are arranged a restriction 17, a pyrotechnic isolation valve 18 and a filter 19. The line 15 enables the tank to be filled with propellant, and the line 16 is a test line for integration assays comprising a valve 28 at its end.

Also, valves 24, 25, 26, 27 are arranged respectively upstream of the propulsion units 20, 21, 22, 23 to control the rate of propellant to each propulsion unit.

The propulsion system is such that the pressurizing gas is mostly contained in the auxiliary tank 140 and the pressurization circuit 14 so as to store in the main tank a volume of propellant greater than the maximum volume of propellant which the main tank 10 can contain when the propulsion system comprises no auxiliary tank 140.

For example, in some cases the main tank 10 can contain a volume of propellant occupying 75% of its volume when the propulsion system comprises no auxiliary tank 140, whereas in the case where the propulsion system comprises such an auxiliary tank 140, the main tank 10 can contain a volume of propellant occupying more than 75% of its volume.

In fact, in systems of the prior art, the volume of gas stored in the pressurization circuit is negligible as the gas is most contained in the upper volume of the tank 10.

With the configuration of the propulsion system described, the volume of gas, usually stored in the upper volume of the tank, is offset to the pressurization circuit by means of the auxiliary tank 140. This makes it possible for a given main tank to boost the storage capacity of the propellant in the propulsion system.

The auxiliary tank 140 is for example spherical, though other forms are feasible as a function of the space available in the carrier.

Also, the auxiliary tank 140 can be dimensioned to contain 2 L of pressurizing gas when the main tank is filled to the maximum with propellant.

With gas such as nitrogen $N_2$ and a propellant such as hydrazine, a main tank 10 having a volume V=5.8 L can contain a maximum volume of propellant of 5.79 L having a pressure $P_{c,0}$=24 bars and a temperature of 50° C. (or a mass of 5.68 kg). For such a volume of propellant there should be $V_{g,0}$=2.02 L of pressurizing gas stored at a pressure $P_{g,0}$=24 bars and a temperature of 50° C. in the auxiliary tank.

Propulsion systems of the prior art can contain a maximum of only 4.29 L hydrazine at a pressure of 24 bars and a temperature of 50° C.

The propulsion system described hereinabove is advantageously designed for spacecraft such as telecommunications or measuring satellites.

The invention claimed is:

1. A propulsion system for a spacecraft, comprising:
   a main tank adapted to contain a volume of propellant and a pressurizing gas which applies pressure to the propellant, the main tank comprising a membrane delimiting an upper volume to contain the pressurizing gas and a lower volume to contain the propellant, the gas applying pressure to the propellant by means of said membrane, said membrane being sealed and isolates the pressurizing gas from the propellant;
   a pressurization circuit connected directly to the main tank;
   the propulsion system being characterized in that it further comprises
   an auxiliary tank adapted to also contain pressurizing gas, the auxiliary tank being connected directly to the main tank by means of the pressurization circuit without a valve so that when in operation, the gas contained in the auxiliary tank expands continuously with the gas contained in the upper volume of the main tank, the pressures prevailing in the upper volume of the main tank, in the pressurization circuit and in the auxiliary tank being identical, the auxiliary tank being dimensioned so that the maximum volume of propellant (Vc,0) of the main tank is greater than the volume of propellant which the main tank can contain when the propulsion system comprises no auxiliary tank.

2. The propulsion system as claimed in claim 1 in which the maximum volume of propellant contained in the propulsion system is greater than 75% of the volume of the main tank.

3. The propulsion system as claimed in claim 1, in which the auxiliary tank has a capacity of two liters.

4. The propulsion system as claimed in claim 1, in which the propellant is hydrazine, the gas is an inert gas and the operating pressure is greater than 5.5 bars at 10° C.

5. The propulsion system as claimed in claim 1, in which the main tank, the auxiliary tank and the pressurization circuit are dimensioned so that the maximum pressure in the main tank is 24 bars at 50° C. when the tank contains the maximum volume of propellant.

6. The propulsion system as claimed in claim 1, comprising a filling/emptying valve of the gas arranged at the end of the pressurization circuit.

7. A spacecraft comprising a propulsion system as claimed in claim 1.

* * * * *